Jan. 7, 1964  G. T. BAKER  3,117,187
TELEPHONE OR LIKE SYSTEMS
Filed Dec. 4, 1958  8 Sheets-Sheet 2

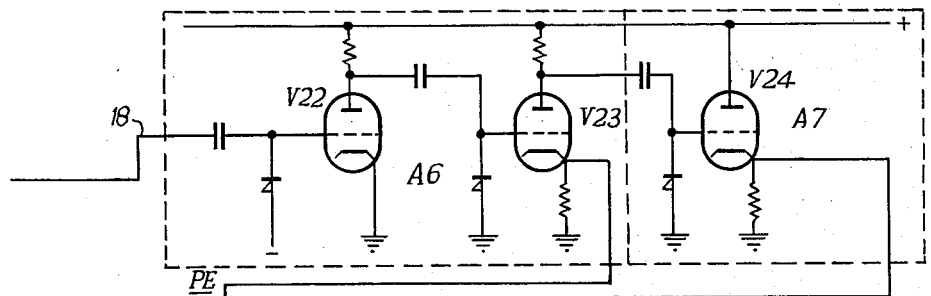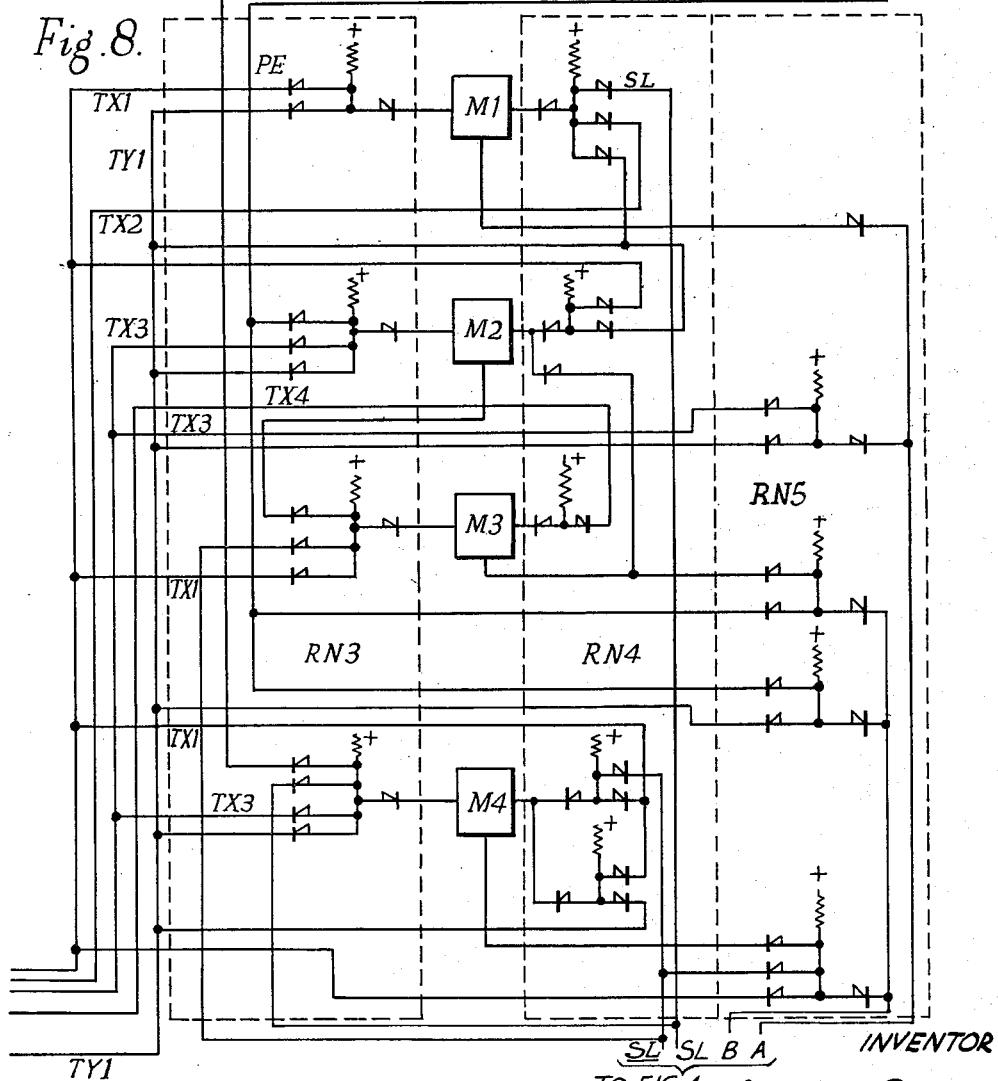
Fig. 8.

United States Patent Office 3,117,187
Patented Jan. 7, 1964

3,117,187
TELEPHONE OR LIKE SYSTEMS
George Thomas Baker, deceased, late of Taplow, England, by Midland Bank Executor and Trustee Company Limited, administrator, London, England, assignor to British Telecommunications Research Limited, Taplow, England, a British company
Filed Dec. 4, 1958, Ser. No. 778,147
Claims priority, application Great Britain July 25, 1951
9 Claims. (Cl. 179—18)

This application is a continuation-in-part of the application of George T. Baker, Serial No. 300,429 filed July 23, 1952.

The present invention relates to electrical signalling systems and is more particularly concerned with arrangements whereby a storage device for the receipt of information in binary form from a signal source can be used by a number of signal sources in common so as to permit control from different signal sources on a time division basis and similar arrangements whereby the stored information may be extracted so as to be passed to an outgoing circuit in the form of trains of impulses.

The invention finds particular application to automatic telephone systems where the use of such trains of impulses for transmitting information from a calling party has been common practice for many years. Moreover because of its compactness and ease of control the type of storage device which lends itself most readily to the purpose of the invention is the so-called magnetic drum type in which a drum having a magnetisable surface is continuously driven at a substantially constant speed and the necessary information is stored by the selective magnetisation of successive small areas forming a track round the circumference of the drum. Such a drum may carry a large number of tracks and the speed at which it operates will be dependent upon the time intervals corresponding to successive operations controlled from unit areas on the track. Drums of comparatively small size are capable of storing in this manner a very large amount of information which can be recorded at high speed and it is this feature which makes it readily possible to employ the drum on a time division basis for a number of circuits thereby offering great possibilities of economy. The information to be stored may be obtained from a key strip, for instance under the control of a telephone operator or direct from a calling line and the numbers are preferably stored in binary code form. This information may be subsequently converted into impulses similar to those dialled by a calling party and suitable for operating switches of the step-by-step type commonly in use, or arrangements may be made whereby the information conveyed by the incoming signals is converted by other equipment associated with the storage device so that the output is in the form of switching impulses transmitted at particular instants which will have a different significance according to the position they occupy in the time cycle. It will be understood that the expression "magnetic drum" is intended to cover also a disc and an endless tape though the cylindrical form offers such advantages that it would generally be used in practice.

Magnetic drum storage devices will record signals with a high degree of permanence if they are undisturbed but in order to simplify the control circuit, it is convenient to operate on a regenerative basis whereby signals are rewritten on each revolution of the drum and not necessarily in the same place. Moreover in order to reduce the bandwidth which the associated circuits are required to transmit, the writing and reading operations preferably work on a "phase switched" basis. Thus for one condition which may be regarded as the 0 or blank condition, the flux is reversed in one sense, say positive to negative, at about the middle of the unit area while for the other condition, the 1 or dot condition, the flux is reversed in the opposite sense, i.e., negative to positive. This, though sacrificing some of the storage space of the drum, is justified in many instances by the greater simplicity of the circuits which it permits, for instance the use of transformers.

The invention will be better understood from the following description of one method of carrying it into effect which should be taken in conjunction with the accompanying drawings comprising FIGS. 1 to 8. Of these, FIG. 1 shows diagrammatically the relationship of the so-called clock waveforms or pulses which control the reading and writing operations and may in practice conveniently be obtained from a group of toggle circuits controlled from an auxiliary track on the drum.

Figure 4:
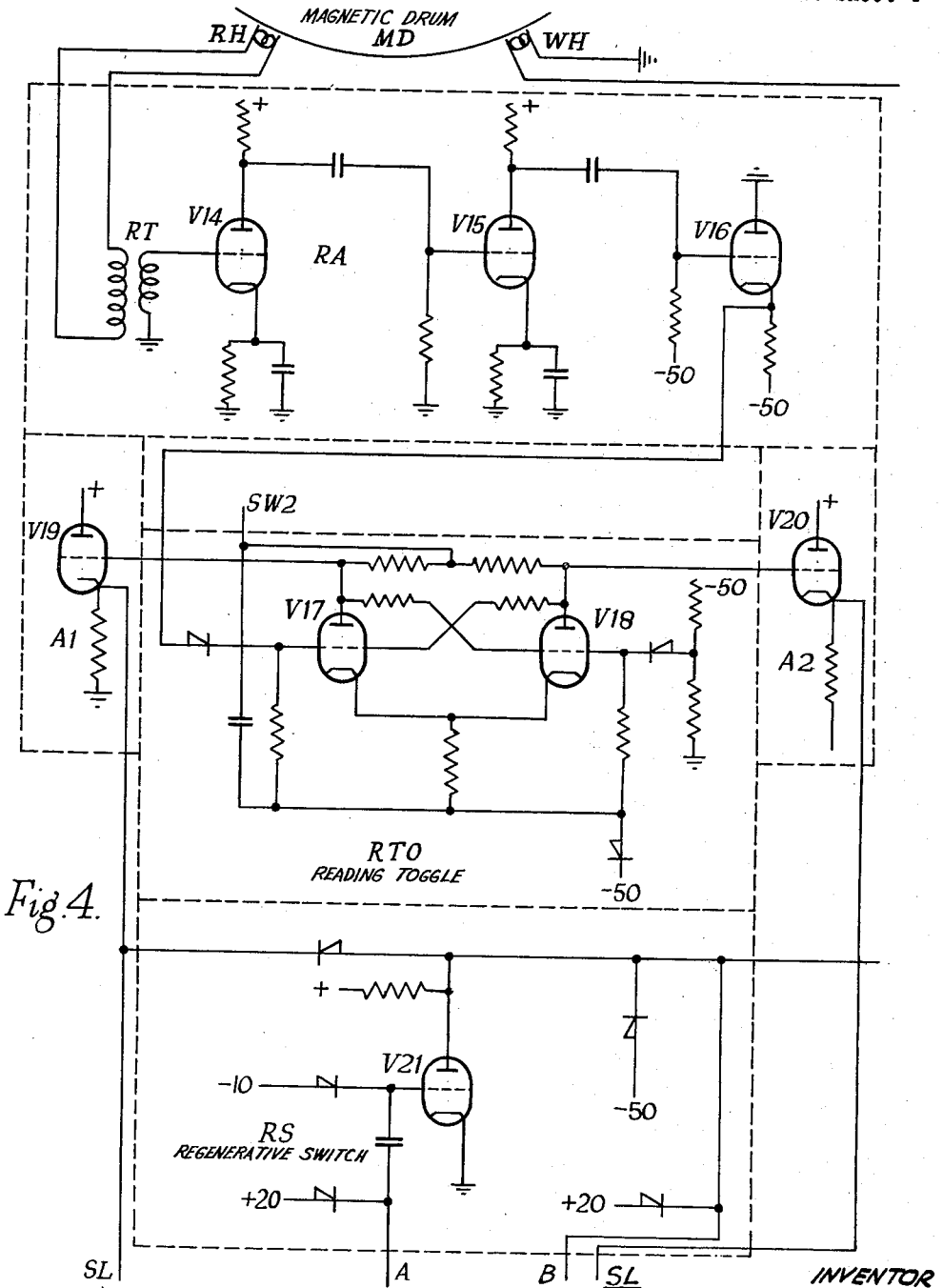
Figure 5:
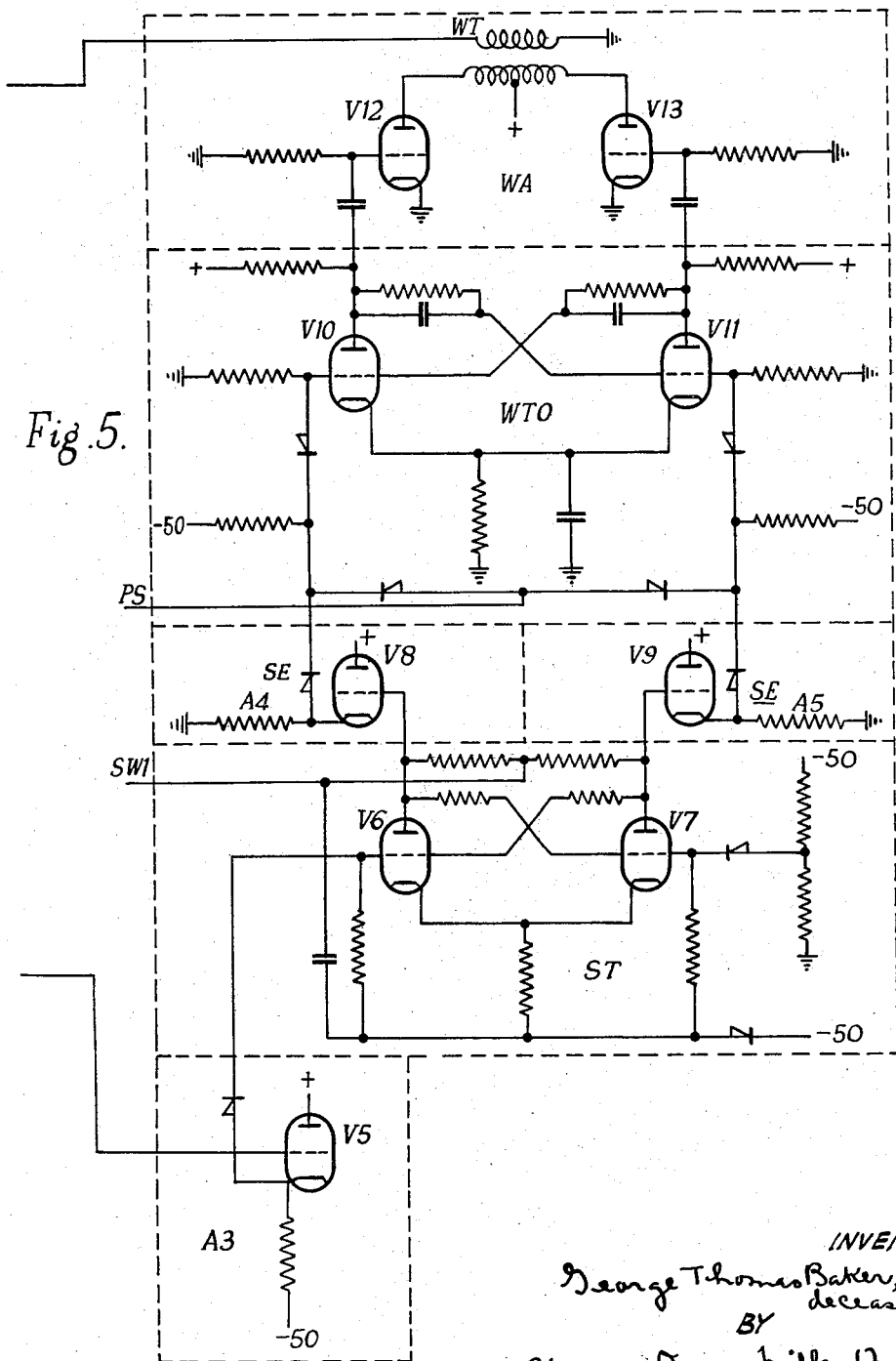

FIGS. 4 and 5 which are intended to fit together with FIG. 4 on the left show the actual circuits of the regenerative loop between the reading and writing heads and the various external connecting leads.

Figure 6:
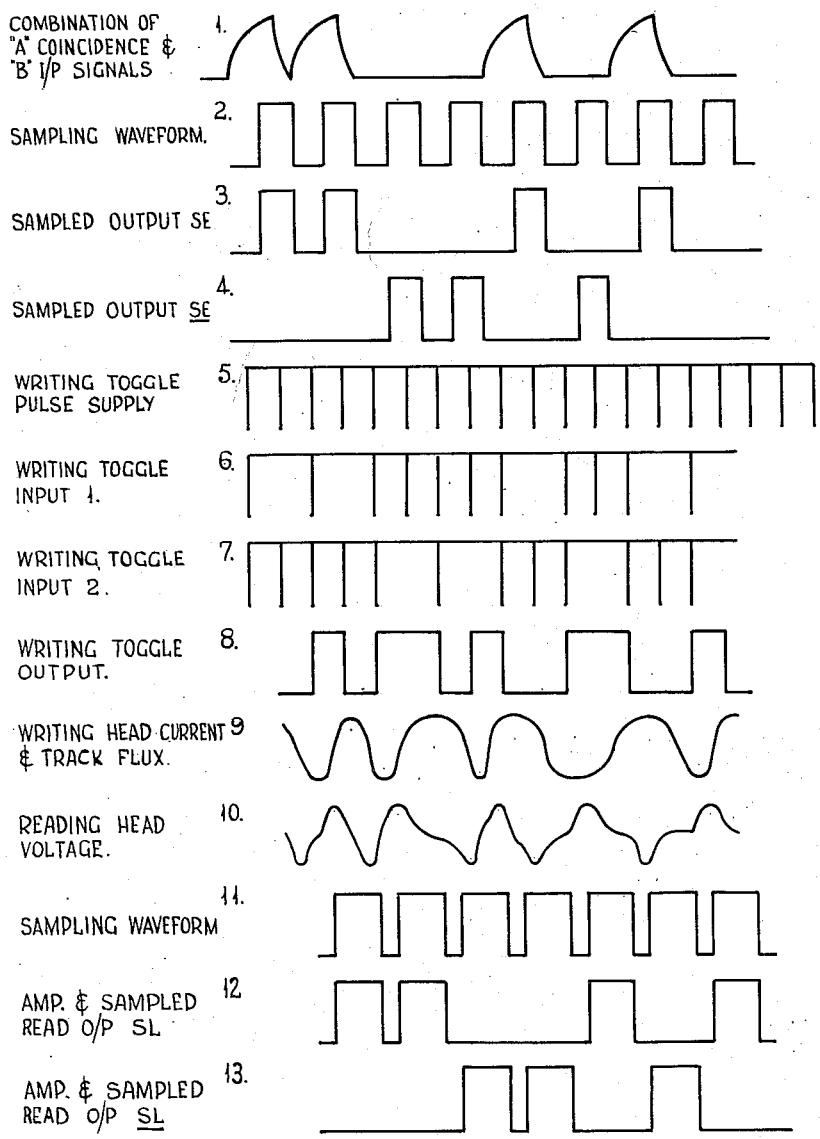

FIG. 6 shows a series of typical waveforms which facilitate the understanding of the operation of the equipment of FIGS. 4 and 5.

Figure 7:
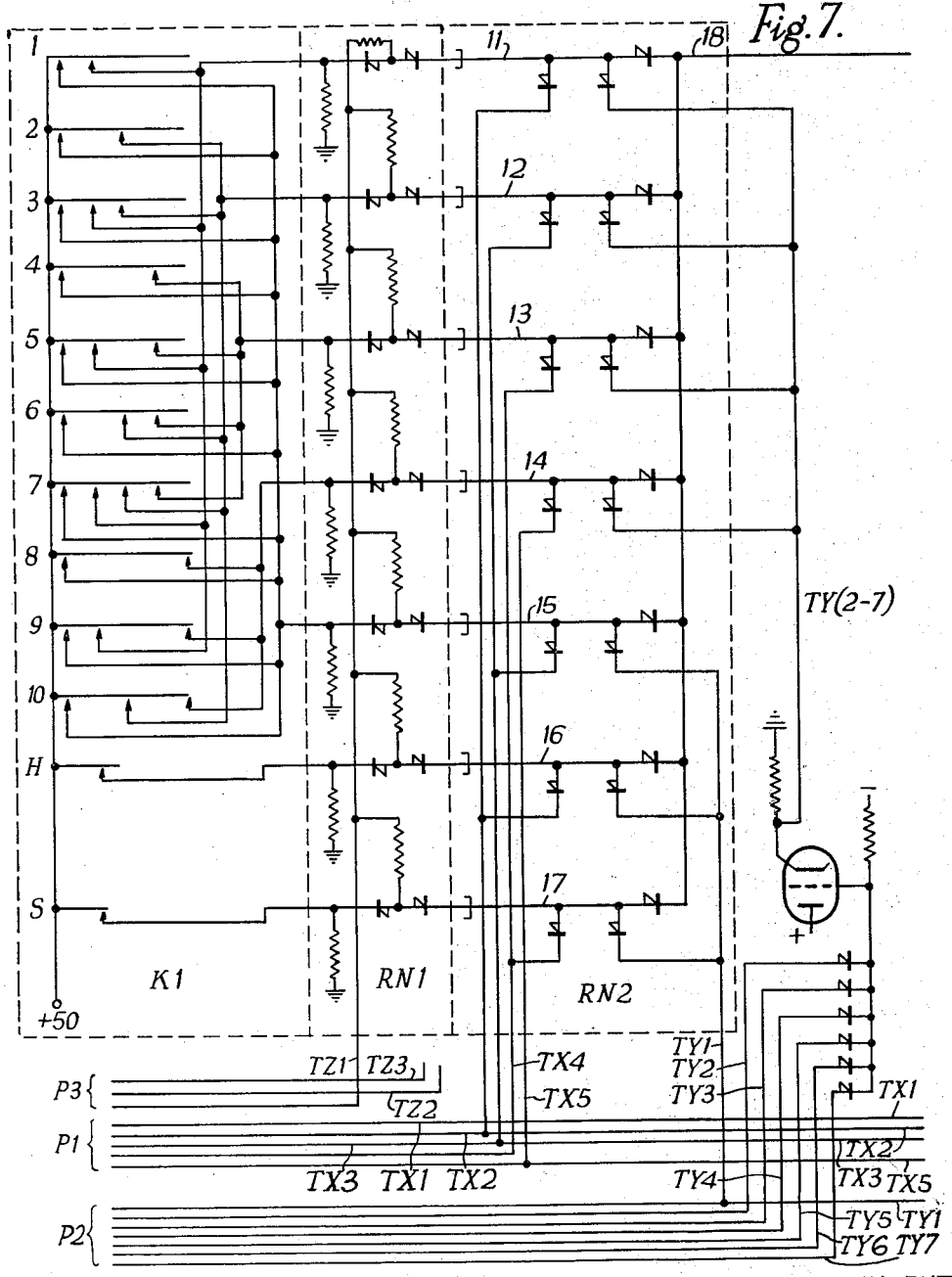

FIGS. 7 and 8 which are intended to fit together with FIG. 7 on the left indicate the circuits of an operator's keyset and the additional equipment required for setting up corresponding numbers on the magnetic drum.

An explanation will first be given of the conventions employed for ease of description of the operations of writing information on to the drum and reading off information recorded thereon. As already pointed out, the magnetic drum permits operation on a binary basis, that is to say each elemental storage area will be in one or other of two conditions which in terms of accepted binary rotation may be regarded as representing 0 or 1 respectively. Alternatively the 1 condition may be thought of as involving a marking or registration while the 0 condition represents a blank condition or no registration. This does not of course correspond directly with the magnetic conditions which on the assumptions made above are strictly complementary and not merely either magnetised or non-magnetised. The output from the reading head will be referred to as SL and its inverse as $\overline{SL}$ and it will accordingly follow that if SL has operating potential connected to it when the reading head encounters a 1, $\overline{SL}$ will have operating potential connected to it when a 0 is encountered.

The control of the writing operation is effected by means of two control leads A and B. When operating potential is connected to lead A, the result is the writing of a 0 while for the writing of a 1, potential is connected to lead B. If potential is connected to both leads simultaneously, the B lead predominates and a 1 is written. The manner in which this is effected will appear from the detailed description which follows.

Figure 1:
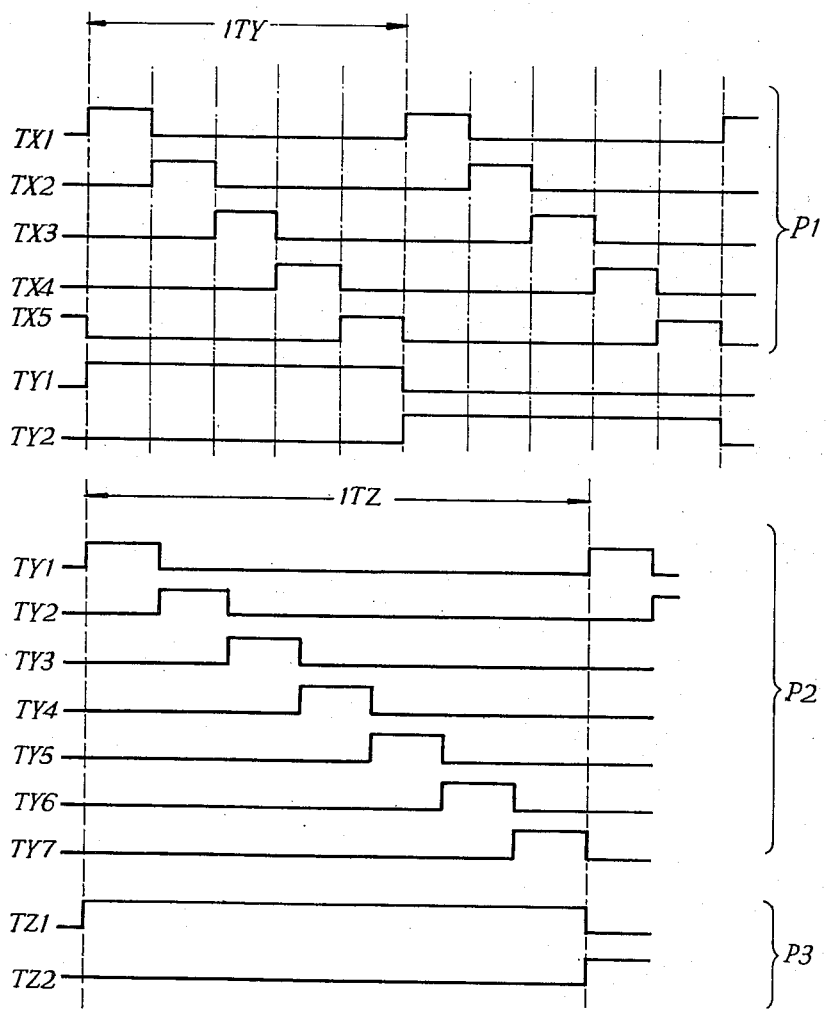

Referring now to FIG. 1, the graphs there shown represent timing waveforms involving positive-going square pulses of for instance, an amplitude of 10 volts, the time scale being horizontal. As will be appreciated, the upper and lower portions of FIG. 1 are not drawn to the same time scale. It will be seen that 5 TX pulses occur successively in the time of one TY pulse and that 7

TY pulses occur successively in the time of one TZ pulse. The total number of TZ pulses might for instance be 20 corresponding to the total registration length of one track on the drum and representing 20 operators' positions. This number is arbitrary however and depends on the speed and diameter of the drum and the amount of information which it is required to record in association with a particular controlled circuit. The manner in which these waveforms control the operation of the drum equipment will appear from the subsequent description.

Figure 2:
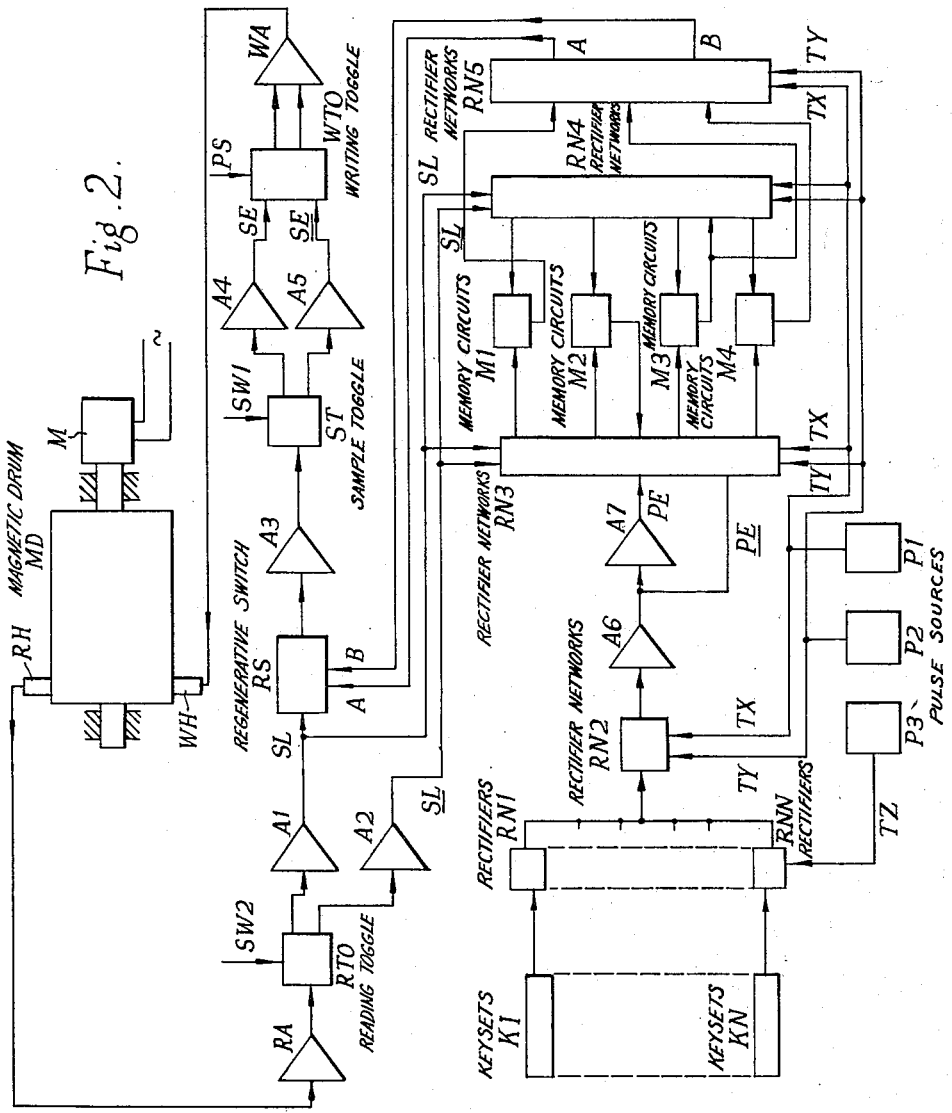
FIG. 2 shows in block schematic form one embodiment of the invention as applied to a magnetic drum arranged to register numbers set up by the operation of any one of a plurality of keysets.

FIG. 2 shows in block schematic form a preferred form of the invention for effecting the registration on a magnetic drum of information set up by successive operations of any one of a plurality of keysets K1 . . . KN. The magnetic drum MD is of known type comprising a drum of bronze or other suitable non-magnetic material with a thin coating of magnetic material, for instance nickel. It is mounted in suitable bearings so as to be rotatable about its own axis and is driven at substantially constant speed by an electric motor M. It is provided with any convenient number of circumferential tracks, one of which is indicated as defined by the reading head RH and the writing head WH. As already explained, operation normally takes place on a regenerative basis but facilities are provided for modifying the regenerative loop by connecting potential to lead A and/or lead B so as to effect the insertion of new information or the cancellation of what is already stored.

The output from the reading head RH is applied to the reading amplifier RA and thence to the reading toggle RTO which is subject to a sampling waveform supplied over lead SW2. After passing through the further amplifier A1, the signals appear as output SL while the inverse output $\overline{SL}$ is obtained by way of amplifier A2. Output SL is fed to the regenerative switch RS which is also controlled by the input on the A and B leads. The signals then pass through the amplifier A3 to the sampling toggle ST controlled by the sampling waveform SW1 and thence to the twin amplifiers A4 and A5. From these the signals pass to the writing toggle WTO to which pulses are fed over the lead PS, the output being supplied by way of the writing amplifier WA to the writing head WH. This regenerative circuit is described in greater detail in connection with FIGS. 4, 5 and 6 and FIGS. 4 and 5 indicate by dotted lines the various pieces of equipment of FIG. 2.

The keysets K1–KN forming the signal sources (of which only the keyset K1 is shown in detail in FIG. 7) have their outputs selected in turn by the rectifier networks RN1—RNN under the control of the waveforms TZ from the pulse source P3. The common output circuit extends to the rectifier network RN2 which is controlled by the waveforms TX and TY obtained respectively from the pulse sources P1 and P2 and after passage of the signals through the amplifier A6, an output $\overline{PE}$ is obtained which is the inverse of the desired output PE obtained from a further amplifier A7. These outputs are fed to the rectifier network RN3 which is also controlled by the outputs SL and $\overline{SL}$ and the waveforms TX and TY and serves to control the operation of the memory circuits M1–M4. The outputs from these memory circuits are supplied to the rectifier networks RN3, RN4 and RN5 and more specifically, the output from M1 extends to RN5, the output from M2 extends to RN3, the output from M3 extends to RN4 and RN5 and the output from M4 to RN5. The rectifier network RN4 controls the reset operation of the memory circuits and the rectifier network RN5 controls the application of suitable potential to leads A and B extending to the regenerative switch RS in order to control the operation of the writing head WH. The rectifier networks are shown in full in FIGS. 7 and 8 where they are indicated by dotted lines.

The grouping of the various storage areas will now be considered in greater detail and it will be understood that this corresponds closely with the arrangement of clock waveforms as shown in FIG. 1. Five unit areas are considered to form a block, the first unit area being used for control purposes while the remaining four serve for binary storage of a digit which may have any value from 0 to 9. Such a block is used for each digit to be dealt with and in the present case it is assumed that six digits are catered for so that seven blocks are required, since the first block which is encountered by the reading head in the direction of rotation is a so-called instruction block which is reserved for control purposes. The seven blocks form a group which is associated with an individual keysender and this forms a Z unit, corresponding to one TZ pulse. Similarly, each TY pulse that is to say the duration of the positive-going excursion of each waveform corresponds to an individual block and each TX pulse to a unit storage area.

Figure 3:
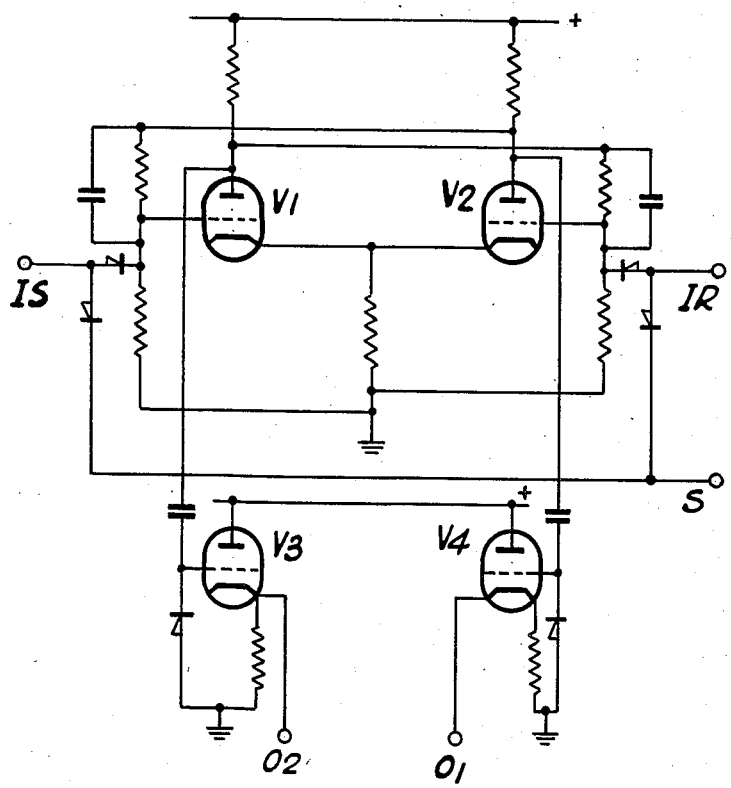
FIG. 3 is a circuit diagram of a so-called memory toggle circuit which is an adaptation of the well-known Eccles-Jordan circuit.

Considering now FIG. 3, this shows details of a suitable so-called "memory circuit" which can be employed as a switching element in a number of situations in connection with the registering equipment. The memory circuit is a toggle circuit having two stable positions and can be changed over from one to the other as a result of suitable potential applied to the input terminals IS and IR for operate and reset respectively. It comprises two triodes V1 and V2 with their grids and anodes cross-connected in known manner, feeding two further triodes V3 and V4 which are connected as cathode followers to give a low impedance output. The normal output, that is to say, positive potential when the toggle is moved to its operated position is obtained from terminal 01, while terminal 02 serves to provide an inverse output which may be required in certain circumstances.

In addition, the operation of the toggle is controlled by pulses applied to terminal S which may be described as a strobe terminal. For the proper operation of the circuits it is desirable that the changeover of the toggle when required should not take place until substantially the end of the particular TX clock pulse concerned in order that the effect of the changeover shall not become operative in that particular position. The TX clock pulse it will be appreciated marks the smallest unit of time with which the system is concerned and corresponds to a single storage area. With the arrangement shown the increased grid potential due to either an operate pulse applied to terminal IS or a reset pulse applied to terminal IR is not sufficient to effect changeover of the toggle until it is reinforced by the very narrow strobe pulse applied to terminal S towards the end of each TX pulse and by this arrangement the reliability of the circuit is assured.

Considering now FIGS. 4 and 5, these show the details of the regenerative loop between the reading and writing heads and also the points at which samples of the stored information can be extracted over leads SL and $\overline{SL}$ and potentials applied over leads A and B to effect writing-in of a 0 or a 1 respectively.

Understanding of the circuit will be facilitated by reference to FIG. 6. For convenience consideration will be given to a typical input which is shown in line 1 of FIG. 6 and represents the combination of successive selective connections of potential to leads A and B. This input after being amplified by the cathode follower V5 forming the amplifier A3 is passed to the toggle circuit ST comprising valves V6 and V7 which are cross-connected in known manner. The operation of the toggle is controlled by the sampling waveform supplied over lead SW1 and corresponding to line 2 in FIG. 6, this being suitably displaced in phase to allow time for the original waveform to attain the necessary amplitude. Two pulse outputs are then obtained, one the inverse of the other and these are suitably amplified by valves V8 and V9 forming the amplifiers A4 and A5 respectively and may be represented by lines 3 and 4 in FIG. 6 corresponding to the input SE to the drum and its inverse $\overline{SE}$. The output from valves V8 and V9 is combined in the writing toggle WT0 with pulses supplied over lead PS from a continuously running pulse supply in accordance with line 5 of FIG. 6 at twice the frequency of the sampling waveform of line 2. Alternate pulses from this supply are directed to valves V10 and V11. As a result an input corresponding to line 6 is supplied to the grid of valve V10 of the writing toggle and an input corresponding to line 7 is supplied to the grid of valve V11. The effect is that the toggle is caused to take up or maintain one or other of its stable positions depending on whether the pulse is directed to the grid of valve V10 or V11. The other alternate pulses, which are not directed, extend to both grids of the toggle and thus produce changeover irrespective of its condition. The writing toggle output is therefore represented by line 8 and it is amplified by the writing amplifier WA comprising valves V12 and V13 connected in push-pull and is fed over the transformer WT to the writing head WH which cooperates with the magnetic drum MD. An indication of the writing head current and track flux is given in line 9 in FIG. 6.

Line 10 shows the voltage generated in the reading head RH when this particular portion of track passes thereunder and this voltage is fed through the transformer RT and amplified by the reading amplifier RA formed by the valves V14, V15 and V16. It is then applied to the reading toggle RT0 comprising valves V17 and V18 where it is subject to a sampling waveform supplied over lead SW2 and indicated in line 11 of FIG. 6 in much the same manner as the curve of line 1 is subject to the sampling waveform of line 2. Subsequently amplification is effected by valves V19 and V20 forming the amplifiers A1 and A2 respectively and corresponding to valves V8 and V9 associated with the input sampler. The amplified and sampled output of the reading head as applied to lead SL is shown in line 12 and the inverse applied to lead $\overline{SL}$ is shown in line 13. It will be noted that line 12 represents a squared form of line 1 but is displaced in time. In order to dispose of this point the location of the reading and writing head may be slightly displaced so that lines 11, 12 and 13 are in effect moved to the left so as to occur 1½ unit areas earlier and are thus simultaneous with line 1. The complete regenerative loop has thus now been traced and in the absence of any further input to the regenerative switch RS over either of the A and B leads this registration will be permanently maintained. It will be noted that the A input is effected by way of valve V21 which acts as an inverter and forms part of a coincidence circuit.

Referring now to FIGS. 7 and 8, these show one method of employing the invention in an automatic telephone system for setting up subscribers' numbers under the control of a keyset at an operator's position. The keyset, assumed to correspond to the keyset K1 of FIG. 2, comprises the usual ten digit keys together with a so-called hold or cancel key and a send key. The operation of any digit key closes one pair of contacts (those on the extreme left) which produce the same effect for every key and in addition the separate keys close further contacts in various combinations which are different for each key, depending upon its digit value. Keysets K1 . . . KN at different operators' positions are arranged to feed a single drum and its associated equipment on a time division basis under the control of TZ pulses and the rectifier networks RN1 . . . RNN and it will be understood that the writing-in of the various digits is controlled in the manner described over leads A and B. It will be recalled that potential connected to lead A results in what may be regarded as a "0" or blank condition while potential connected to lead B produces what may be regarded as a "1" or dot condition. If potential is connected to both leads simultaneously, writing-in of a "1" takes place, that is to say, the B lead predominates.

The output from a number of keysets is connected under TZ pulse control to the amplifier A6 comprising valves V22 and V23. The output from the cathode of valve V23 represents the inverse output which will be described as $\overline{PE}$ while the normal output PE is obtainable from the cathode of valve V24 forming amplifier A7.

It is assumed that the equipment caters for a 6-digit number, there being one storage block for each digit and an instruction block which precedes the digit blocks. Each block comprises five unit areas which in the case of the digit blocks represent one area for marking purposes and four for storage in binary or similar code. Thus as previously pointed out there are five TX pulses within each TY pulse and seven TY pulses with each TZ pulse. The number of TZ pulses depends on the number of operators' positions dealt with in the full circumference of the track.

Considering the operations which take place when a number is to be set up from a keyset, it should first be explained what takes place while no keyset is being used. The circuit makes use of the rectifier networks RN2-RN5 each of which includes a number of so-called coincidence circuits or AND gates which comprise groups of rectifiers in association with a resistor and a source of potential whereby appropriate potential is only applied to a control lead if positive is applied simultaneously to all the circuits extending through the rectifiers. FIG. 8 also shows the use of four memory circuits M1, M2, M3, M4 each of which comprises a toggle similar to that shown in FIG. 3. The output corresponding to positive on lead 01 in this figure is assumed to be applied to the lead extending from the bottom of each rectangle representing a toggle circuit.

Considering first the operation of the memory circuit M1, the coincidence circuit in rectifier network RN3 involving the time pulses TX1 and TY1 has the result that during the association of the writing head with the first unit area in the first or instruction block individually associated with the respective keysets, memory circuit M1 is operated and thereupon applies potential to lead A so as to effect erasure of any storage which is encountered in subsequent storage areas as long as this condition persists. Thus as long as any particular keyset is not being used, the storage areas associated therewith will be cleared of any registrations. It will be understood that the time pulses TZ1, TZ2, TZ3 . . . correspond to the different operators' positions making use of the same track.

When an operator desires to make use of her keyset, for instance the operator at the first position corresponding to the time pulse TZ1 and having the keyset K1, she first presses the hold key H as a result of which potential is applied to lead 16 for the duration of the time pulse TZ1, and hence during the scanning of the second unit area of the instruction block appropriate to this particular keyset, this potential is applied by way of rectifier network RN2 to lead 18 and is amplified by valves V22, V23 and V24, FIG. 8 to give an output on lead PE. It will be appreciated from FIG. 7 that the instant of time at which this takes place is determined by the coincidence of time pulses TX2, TY1 and TZ1. As a result of the effect of the coincidence circuit involving this output PE and time pulse TY1, potential is applied by way of rectifier network RN5 to lead B to cause a marking in this position. Consequently, on the next revolution of the drum, the coincidence circuit SL, TX2, TY1 forming part of rectifier network RN4 becomes effective since there is potential on lead SL at the appropriate time due to the above-mentioned marking being encountered by the reading head. Hence the memory circuit M1 is reset and potential is thereby removed from lead A so that the steady erasure which was previously effective no longer takes and thus the drum is prepared to store information corresponding to the operation of the keyset. Since the key H is of the locking type, it will follow that as long as it remains operated, memory circuit M1 is operated at the beginning of each TZ pulse but is immediately reset.

Assuming that the operator wishes to record the number 365214, she will first press key 3, as a result of which potential is connected during time pulse TZ1 to leads 11, 12 and 15. Potential on lead 15 produces an output PE during time pulse TX3 corresponding to the scanning of the instruction block and this results in a registration in area 3 of the instruction block owing to the coincidence of PE and TY1 enabling potential to be applied to lead B. This circuit it will be noted overrides the effect of the coincidence circuit TX3, TY1 which is continuously operative to connect potential to lead A as regards this storage area. In addition this PE output causes memory circuit M2 to be operated. The output of this memory circuit is applied to a coincidence circuit involving also SL and TX1 so that when next a block is encountered having no registration in the first position, the memory circuit M3 is operated. Since 3 is the first digit of the number concerned, the appropriate block for this registration is the second block of the group, that is to say the one after the instruction block. The operation of memory circuit M3 resets memory circuit M2 and permits the output PE to apply a potential to lead B so as to enable the effect of the digit key 3 to be registered. Since potential is applied to leads 11 and 12, a PE output is available in positions 2 and 3 of all the storage blocks 2–7, i.e. all blocks after the instruction block.

At the end of the scan over the digit block concerned however, memory circuit M3 is reset by time pulse TX5 and hence the digit will not be registered in any other block if the operator still has the key pressed as will probably be the case. On the next and subsequent scans as long as the key is held, the whole process is repeated but without producing any new effect.

On the release of the key, potential is no longer applied to lead 15 and hence an output is obtained from $\overline{PE}$ rather than PE while position 3 of the instruction block is co-operating with the reading head. Coincidence circuit $\overline{PE}$, SL, TX3, TY1 is accordingly effective in view of the registration in this position due to the previous operation of the key and accordingly memory circuit M4 is operated. This thereupon by means of the coincidence circuit M4, $\overline{SL}$, TX1 makes a registration in the first digit storage block next encountered in which no such registration exists. In the circumstances assumed, this is the first digit storage block, in which registration of the digit 3 has just taken place and accordingly by the connection of potential to lead B a registration is now made in this space to ensure that no further registration shall be made in this digit storage block which would obviously mutilate the registration just made. Moreover a reset circuit for memory circuit M4 is completed in this position thereby ensuring that only one digit block shall be given a busy marking. A further reset circuit is provided over leads TX1 and TY1 in the cases of memory circuits M2 and M4 to ensure that they shall be reset in any event at the beginning of the scan of each group. The registration in position 3 of the instruction block is cancelled on the next revolution by the application of potential to lead A over coincidence circuit TX3, TY1.

When the operator presses key 5, connection of potential to lead 15 again results in a registration being made in the third position in the instruction block and potential connected to leads 11 and 13 has the effect that registration is made in positions 2 and 4 of the second digit storage block, the first digit storage block being passed over in this case since the registration in the first position of this block prevents the operation of memory circuit M3 at this time. On the release of digit key 5, a registration is made in the first position in the second digit storage block to guard this block against any further attempt at registration therein.

The operation of key 6 produces similar effects, namely by application of potential to lead 15, registration is effected in the third area of the instruction block and due to the potential on leads 12 and 13, registration is effected in areas 3 and 4 of the third digit storage block. Moreover on the release of the key, registration is effected in the first position of the block to indicate that a digit is stored therein. The subsequent operation of digit keys 2, 1 and 4 results in corresponding registrations in the 4th, 5th and 6th digit storage blocks.

When the operator desires to initiate the sending out of trains of impulses corresponding to the registered digits, she will momentarily operate the send key S whereupon in consequence of the connection of potential to lead 17 during the TZ1 time pulse, registration is made in position 4 of the instruction block and this is arranged to initiate sending in a manner which is not described in the present specification but is dealt with in the application of G. T. Baker et al., Serial No. 300,430 filed July 23 1952.

When the operator no longer wishes to make use of the keyset circuit or if she has made some mistake which she wishes to cancel, she will restore the hold key H. Thereupon potential is no longer connected over lead 16 to effect the regeneration of the registration in position 2 of the instruction block and as a result there is no circuit for resetting the memory circuit M1. Consequently when this memory circuit is re-operated as usual at the beginning of the succeeding scan, it remains in operated position and serves to erase any registrations then present.

I claim:

1. In a telephone system, a magnetic drum, means for rotating said drum at a substantially constant speed, a writing head located adjacent to said drum, means for supplying operating current to said writing head to cause the selective magnetisation on a binary basis of a series of elements forming a track round the circumference of said drum, a signal source for generating signals corresponding to wanted subscribers' numbers, control equipment for said operating current supply means, a first control lead, means in said control equipment responsive to the connection of potential to said first control lead for causing the magnetisation of successive elements of said track in a particular manner, a second control lead, means in said control equipment responsive to the connection of potential to said second control lead for causing the magnetisation of successive elements of said track in the opposite manner, means in said control equipment for causing the effect of said first control lead to predominate over the effect of said second control lead if potential is connected to both said leads simultaneously, and means in said control equipment responsive to signals from said source for connecting potential to said first control lead.

2. In a telephone system, a magnetic drum, means for rotating said drum at a substantially constant speed, a writing head located adjacent to said drum, means for supplying operating current to said writing head to cause the selective magnetisation of a series of elements forming a track round the circumference of said drum, a plurality of digit keysets, a group of control leads, means responsive to the operation of any one of said keysets for selectively applying potential to said control leads, a first pulse source for connecting potential in turn to a first group of pulse leads for periods corresponding to the time taken for an element of said track to move past said writing head, a second pulse source for connecting potential in turn to a second group of pulse leads for periods corresponding to the time taken for the elements of said track required for the registration of a complete digit to move past said writing head, a third pulse source for connecting potential in turn to a third group of pulse leads for periods corresponding to the time taken for the groups of elements required for the registration of a complete subscriber's number to move past said writing heads, means jointly controlled by the potentials on said first pulse leads, said second pulse leads and said control leads for influencing said current supply means to cause the registration on groups of successive elements of said track of digits of subscribers' numbers corresponding to the operation of said keysets and means controlled by said third set of pulse leads for associating said keysets with said control leads successively in turn.

3. In a system as claimed in claim 2, a control key associated with said digit keyset, means jointly controlled by said control key and said third group of pulse leads for connecting potential to one of said control leads and means in said control equipment responsive to said connection of potential for preventing the erasure of registrations made on said track in positions associated with the particular one of said third pulse leads to which potential is connected.

4. In a telephone system, a magnetic drum, means for rotating said drum at a substantially constant speed, a writing head located adjacent to said drum, means for supplying operating current to said writing head to cause the selective magnetisation of a series of elements forming a track round the circumference of said drum, a digit keyset, a group of control leads, means responsive to the repeated operation of said keyset in accordance with the digits of a wanted number for selectively applying potential to said control leads, a first pulse source for connecting potential in turn to a first group of pulse leads for periods corresponding to the time taken for an element of said track to move past said writing head, a second pulse source for connecting potential in turn to a second group of pulse leads for periods coresponding to the time taken for the group of elements of said track required for the registration of a complete digit to move past said writing head, means jointly controlled by the potentials on said first pulse leads, said second pulse leads and said control leads for influencing said current supply means to cause the registration on groups of successive elements of said track of digits corresponding to the repeated operation of said keyset, control equipment for marking one of the elements of said group when said group has a digit registered therein and means responsive to the presence of said marking for preventing the registration of a further digit in the said group of elements.

5. In a system as claimed in claim 4, means controlled by any one of the digit keys of said keyset for connecting potential to one of said control leads and means in said control equipment for preventing marking of said one element as long as potential is connected to said one lead by the maintenance of any of said digit keys in operated position.

6. In a telephone system, a magnetic drum, means for rotating said drum at a substantially constant speed, a writing head located adjacent to said drum, means for supplying operating current to said writing head to cause the selective magnetisation of a series of elements forming a track round the circumference of said drum, a signal source, a first pulse source for connecting potential in turn to a first group of pulse leads for periods corresponding to the time taken for an element of said track to move past said writing head, a second pulse source for connecting potential in turn to a second group of pulse leads for periods corresponding to the time taken for the group of elements of said track required for the registration of a complete digit to move past said writing head, a third pulse source for connecting potential in turn to a third group of pulse leads for periods corresponding to the time taken for a plurality of groups of elements totalling one more than the number of digits in a complete subscriber's number to move past said writing head, control means for selectively marking the various elements in said additional group of elements and means responsive to said selective markings for controlling the registration of digits in the remainder of said groups in accordance with signals received from said source.

7. In a telephone system, a magnetic drum, means for rotating said drum at a substantially constant speed, a writing head located adjacent to said drum, means for supplying operating current to said writing head to cause the selective magnetisation of a series of elements forming a track round the circumference of said drum, a digit keyset, a group of control leads, means responsive to the repeated operation of said keyset in accordance with the digits of a wanted number for selectively applying potential to said control leads, a first pulse source for connecting potential in turn to a first group of pulse leads for periods corresponding to the time taken for an element of said track to move past said writing head, a second pulse source for connecting potential in turn to a second group of pulse leads for periods corresponding to the time taken for the group of elements of said track required for the registration of a complete digit to move past said writing head, a third pulse source for connecting potential in turn to a third group of pulse leads for periods corresponding to the time taken for a plurality of groups of elements totalling one more than the number of digits in a complete subscriber's number to move past said writing head, means responsive to the continued operation of any key in said digit keyset for applying potential to one of said control leads and means responsive to said application for selectively marking one of said elements in said additional group of elements.

8. In a telephone system, a magnetic drum, means for rotating said drum at a substantially constant speed, a writing head located adjacent to said drum, means for supplying operating current to said writing head to cause the selective magnetisation of a series of elements forming a track round the circumference of said drum, a reading head located adjacent to said drum in line with said track, a digit keyset, a group of control leads, means responsive to the repeated operation of said keyset in accordance with the digits of a wanted number for selectively applying potential to said control leads, a first pulse source for connecting potential in turn to a first group of pulse leads for periods corresponding to the time taken for an element of said track to move past said writing head, a second pulse source for connecting potential in turn to a second group of pulse leads for periods corresponding to the time taken for the elements of said track required for the registration of a complete digit to move past said writing head, a two-position toggle circuit, means for operating said toggle circuit from its normal position under the joint control of said first and second groups of pulse leads, means controlled by said toggle circuit in its operated position for erasing registrations on said drum and means jointly controlled by said reading head and said first and second groups of pulse leads for restoring said toggle circuit to its normal position to disconnect said means for erasing registrations on said drum.

9. In a system as claimed in claim 8, a source of potential similar to the potential applied to said first and second groups of pulse leads, a resistor, means for applying said potential to said toggle circuit through said resistor, and connections from said pulse leads to said toggle circuit by way of rectifiers in the non-conductive direction whereby potential for the operation of said toggle circuit is only available if it is connected simultaneouly to all the pulse leads connected to said toggle circuit by way of said rectifiers.

References Cited in the file of this patent

UNITED STATES PATENTS

| | | |
|---|---|---|
| 2,767,246 | Retallack | Oct. 16, 1956 |
| 2,805,286 | Baker | Sept. 3, 1957 |
| 2,850,720 | Oliwa | Sept. 2, 1958 |

FOREIGN PATENTS

| | | |
|---|---|---|
| 763,828 | Great Britain | Dec. 19, 1956 |